United States Patent [19]

Lighthall et al.

[11] 3,858,187

[45] Dec. 31, 1974

[54] READ ONLY MEMORY SYSTEM

[75] Inventors: John T. Lighthall; Harry A. Toy, both of Brockville, Ontario, Canada

[73] Assignee: GTE Automatic Electric (Canada) Ltd., Brockville, Ontario, Canada

[22] Filed: Jan. 11, 1974

[21] Appl. No.: 432,621

[52] U.S. Cl. .......................... 340/173 R, 340/172.5

[51] Int. Cl. .......................... G11c 7/00, G11c 17/00

[58] Field of Search ........ 340/173 R, 172.5, 173 SP

[56] References Cited

UNITED STATES PATENTS 3,771,145 11/1973 Wiener .......................... 340/173 R

*Primary Examiner*—Stuart N. Hecker
*Attorney, Agent, or Firm*—David M. Keay; R. T. Orner; T. C. Jay, Jr.

[57] ABSTRACT

Read only memory system employing an array of memory elements each of which stores 256 8-bit word segments. Each program word to be read out of the system contains 20 bits. The first 8 bits of a program word are stored in a word segment of a first memory element and the second 8 bits are stored in the corresponding word segment of a second memory element. The last 4 bits are stored in 4 bit positions of the corresponding word segment of a third memory element. The other 4 bit positions of this word segment contain the last 4 bits of another program word which has its first 16 bits stored in two other memory elements. The desired program word is read out by addressing the appropriate word segment of every memory element of the array, and by applying memory element select signals to the three memory elements containing portions of the desired program word. The memory element select signal to the third memory element is generated by the memory element select signal to the first and second memory elements. Such a signal to the third memory element would also be generated if the other program word were the program word desired. The first 16 bits are read out of the two memory elements directly in parallel. The 4-bit portions of the two program words in the same word segment of the third memory element are read out to two separate gating arrangements. The memory element select signal which is applied to the first two memory elements is also applied to the gating arrangement receiving the 4-bit portion of the desired program word. Thus, the last 4 bits of the desired program word are read out through the one gating arrangement while the last 4 bits of the other program word from the same word segment of the third memory element are blocked by the other gating arrangement.

6 Claims, 8 Drawing Figures

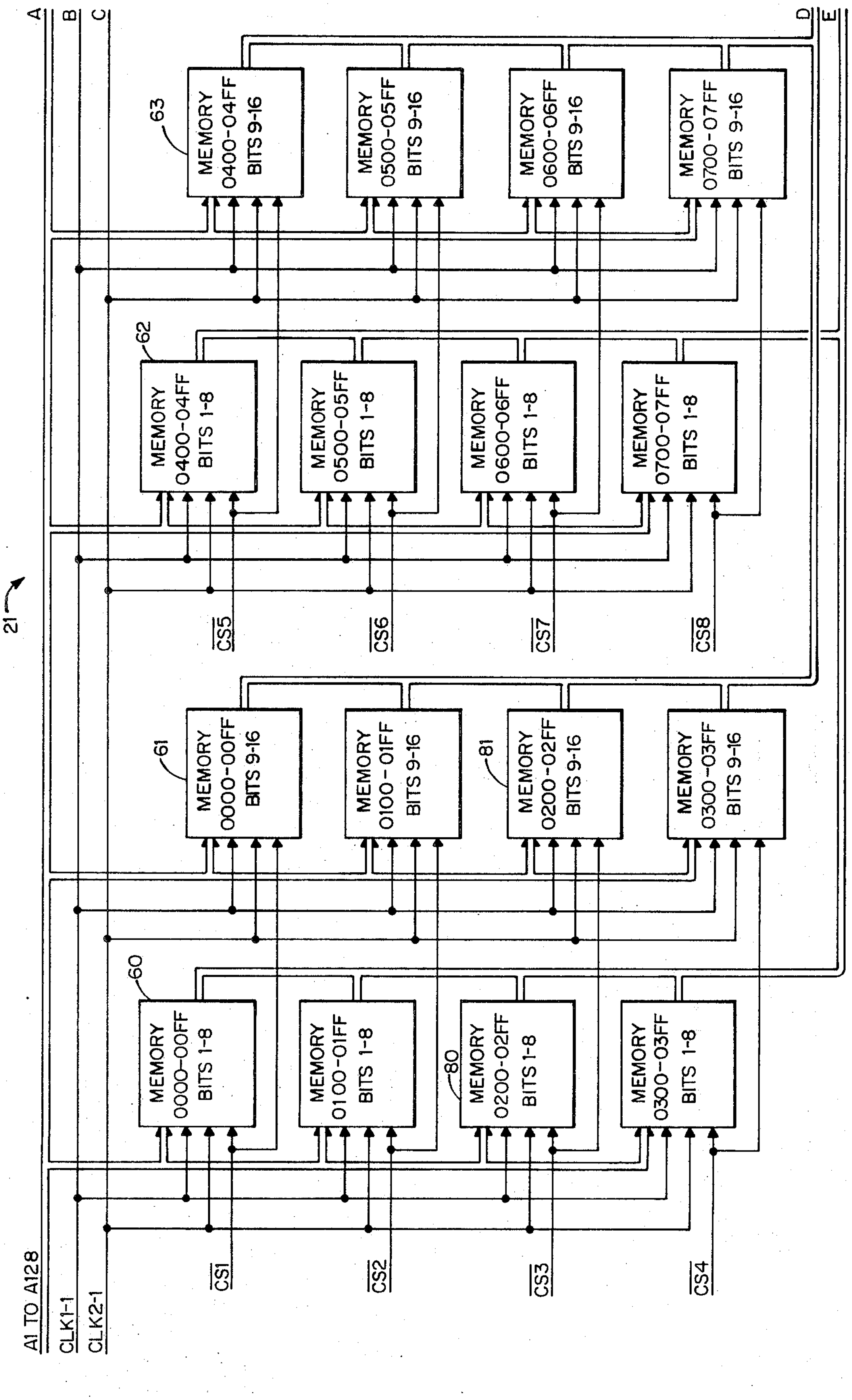
Fig. 4 (Sheet 1 of 2).

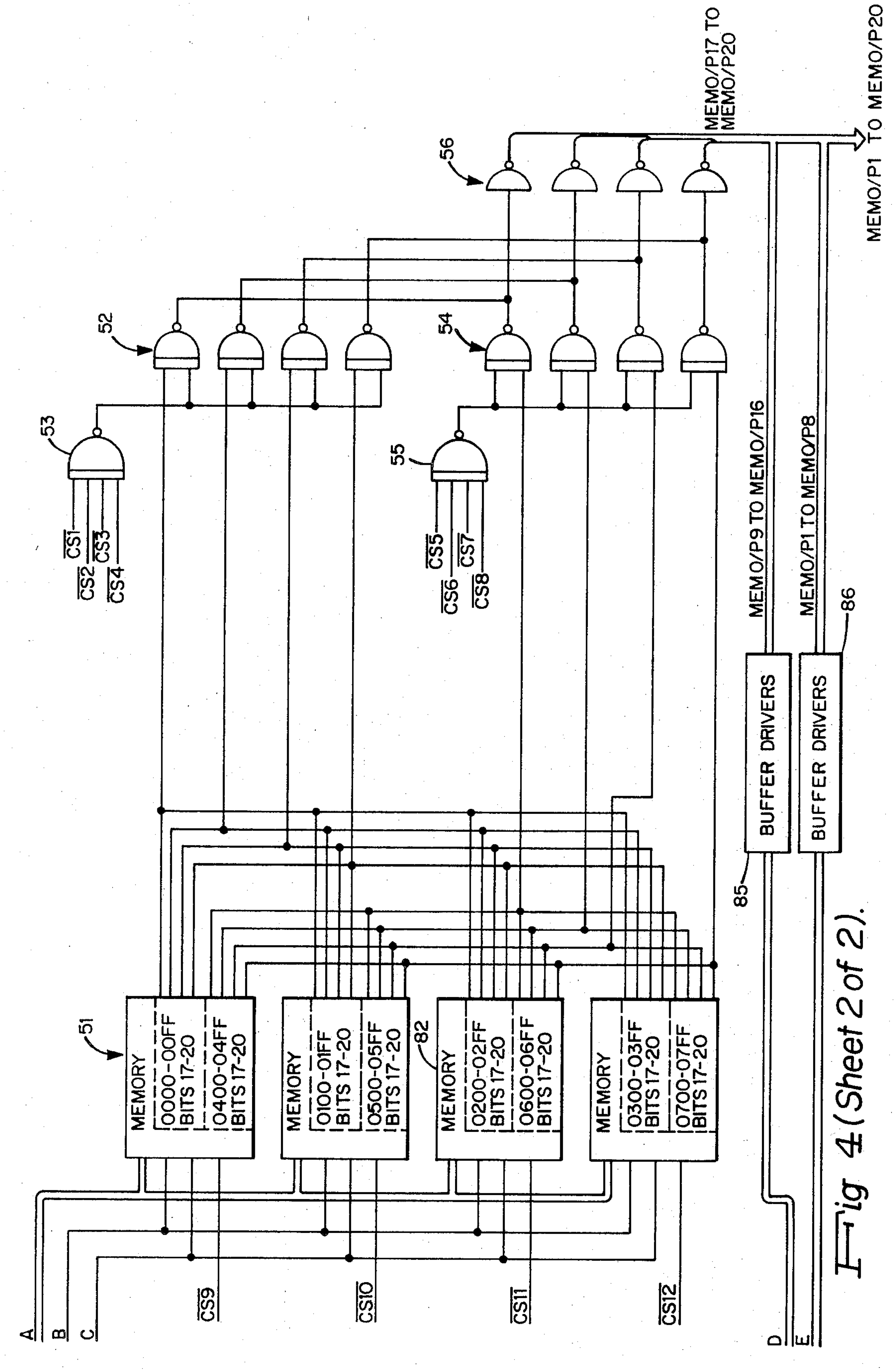
Fig 4 (Sheet 2 of 2).

MEMORY ELEMENT SELECTION

| $\overline{\text{SDAT 10}}$ | $\overline{\text{SDAT 11}}$ | $\overline{\text{SDAT 12}}$ | $\overline{\text{CS 1}}$ | $\overline{\text{CS 2}}$ | $\overline{\text{CS 3}}$ | $\overline{\text{CS 4}}$ | $\overline{\text{CS 5}}$ | $\overline{\text{CS 6}}$ | $\overline{\text{CS 7}}$ | $\overline{\text{CS 8}}$ | $\overline{\text{CS 9}}$ | $\overline{\text{CS 10}}$ | $\overline{\text{CS 11}}$ | $\overline{\text{CS 12}}$ |
|---|---|---|---|---|---|---|---|---|---|---|---|---|---|---|
| 1 | 1 | 1 | 0 | 1 | 1 | 1 | 1 | 1 | 1 | 1 | 0 | 1 | 1 | 1 |
| 1 | 1 | 0 | 1 | 0 | 1 | 1 | 1 | 1 | 1 | 1 | 1 | 0 | 1 | 1 |
| 1 | 0 | 1 | 1 | 1 | 0 | 1 | 1 | 1 | 1 | 1 | 1 | 1 | 0 | 1 |
| 1 | 0 | 0 | 1 | 1 | 1 | 0 | 1 | 1 | 1 | 1 | 1 | 1 | 1 | 0 |
| 0 | 1 | 1 | 1 | 1 | 1 | 1 | 0 | 1 | 1 | 1 | 0 | 1 | 1 | 1 |
| 0 | 1 | 0 | 1 | 1 | 1 | 1 | 1 | 0 | 1 | 1 | 1 | 0 | 1 | 1 |
| 0 | 0 | 1 | 1 | 1 | 1 | 1 | 1 | 1 | 0 | 1 | 1 | 1 | 0 | 1 |
| 0 | 0 | 0 | 1 | 1 | 1 | 1 | 1 | 1 | 1 | 0 | 1 | 1 | 1 | 0 |

READ ONLY MEMORY SYSTEM

CROSS-REFERENCE TO RELATED APPLICATIONS

This invention is related to communication switching systems disclosed in application Ser. No. 255,485, filed May 22, 1972, by Robert A. Borbas, John P. Dufton, Robert W. Duthie, John T. Lighthall, Thomas J. Moorehead, and George Verbaas entitled "Communication Switching System with Modular Organization and Bus," now U.S. Pat. No. 3,767,863, and application Ser. No. 295,630, filed Oct. 6, 1972, by Robert A. Borbas entitled "Bus Control Arrangement for a Communication Switching System," now U.S. Pat. No. 3,812,297.

BACKGROUND OF THE INVENTION

This invention relates to read only memory systems. More particularly, it is concerned with read only memory systems employing memory elements of fixed word length which are combined to produce words of any desired length.

In the fabrication of memory systems, particularly read only memory systems, standard memory elements are frequently combined with various addressing and output logic. The memory elements are standard items available as individual components and provide for words of a particular fixed length. That is, when a particular address signal is received by the memory element a fixed number of bits are read out in parallel. For example, one standard memory element available as a single component has a capacity of 256 8-bit words. When one of the 256 words is address the 8 bits of that word are read out in parallel.

Memory systems employing words of lengths which are integral multiples of the 8-bit words may be constructed by appropriately interconnecting memory elements so as to permit the entire capacity of an array of memory elements to be utilized. However, if the word length employed is not an integral multiple of an 8-bit word, the total capacity of the system may not be utilized. For example, the instruction program for the central processor of the communication system described in the referenced applications employs 20-bit program words. In order to store a 20-bit program word employing the aforementioned memory elements, three 8-bit word positions, a total of 24-bit positions, would be required. In the system of the referenced applications the stored program memory employs a total of 8,192 20-bit program words. Employing existing techniques which use 3 8-bit words for the storage of each 20-bit program word requires a total of 96 memory elements. If maximum utilization can be made of the storage capacity in the system, a total of 80 memory elements is required.

SUMMARY OF THE INVENTION

Memory systems in accordance with the present invention provide for utilizing the full capacity of memory elements when the number of bits of each word to be stored is other than an integral multiple of the number of bits capable of being stored in each word segment of the memory elements. The memory system has stored therein a plurality of words, each word having a fixed number of bits, and includes an array of memory elements. Each memory element has the capacity for storing a quantity of word segments, and has address input connections for selectively addressing each word segment as determined by signals applied thereto. Each memory element has a number of output connections equal to the number of bits of a word segment. Each memory element also has a memory element select connection, and is operable in response to a signal thereat to permit the bits of the word segment addressed by the signals at the address input connections to be read out at the output connections in parallel. Each word segment has a different number of bits than the fixed number of bits of a word. In certain of the memory elements each of the word segments contains portions of different words.

The system also includes address receiving means for receiving address information which selectively identifies a particular word of the plurality of words stored in the array of memory elements. A first portion of the address information designates a particular one of the word segments of the quantity of word segments in each of the memory elements. A second portion of the address information designates the memory elements which have stored therein bits of the particular word. A first means of a decoding means is coupled to the address receiving means and to the address input connections of all the memory elements of the array and applies signals to the address input connections in order to address the particular word segment of each of the memory elements as designated by the first portion of the address information.

A second means of the decoding means is coupled to the address receiving means and to the memory element select connections of the memory elements of the array. The second means of the decoding means applies a signal to the memory element select connections of only the memory elements containing bits of the particular word as designated by the second portion of the address information. Thus, certain of the memory elements which contain portions of different words in the same word segments receive a signal at the memory element select connection if designated by the second portion of the address information as containing bits of the particular word.

An output gating means is coupled to the output connections of the certain memory elements and to the second means of the decoding means. The output gating means permits bits read out of one of the certain memory elements which are part of the particular word to pass therethrough, and prevents bits read out of the same word segment of the certain memory element which are not part of the particular word from passing therethrough.

BRIEF DESCRIPTION OF THE DRAWINGS

Additional objects, features, and advantages of memory systems in accordance with the present invention will be apparent from the following detailed discussion together with the accompanying drawings wherein:

FIG. 4 is a detailed block diagram of one of the memory arrays employed in the system;

DETAILED DESCRIPTION OF THE INVENTION

General

Figure 1:
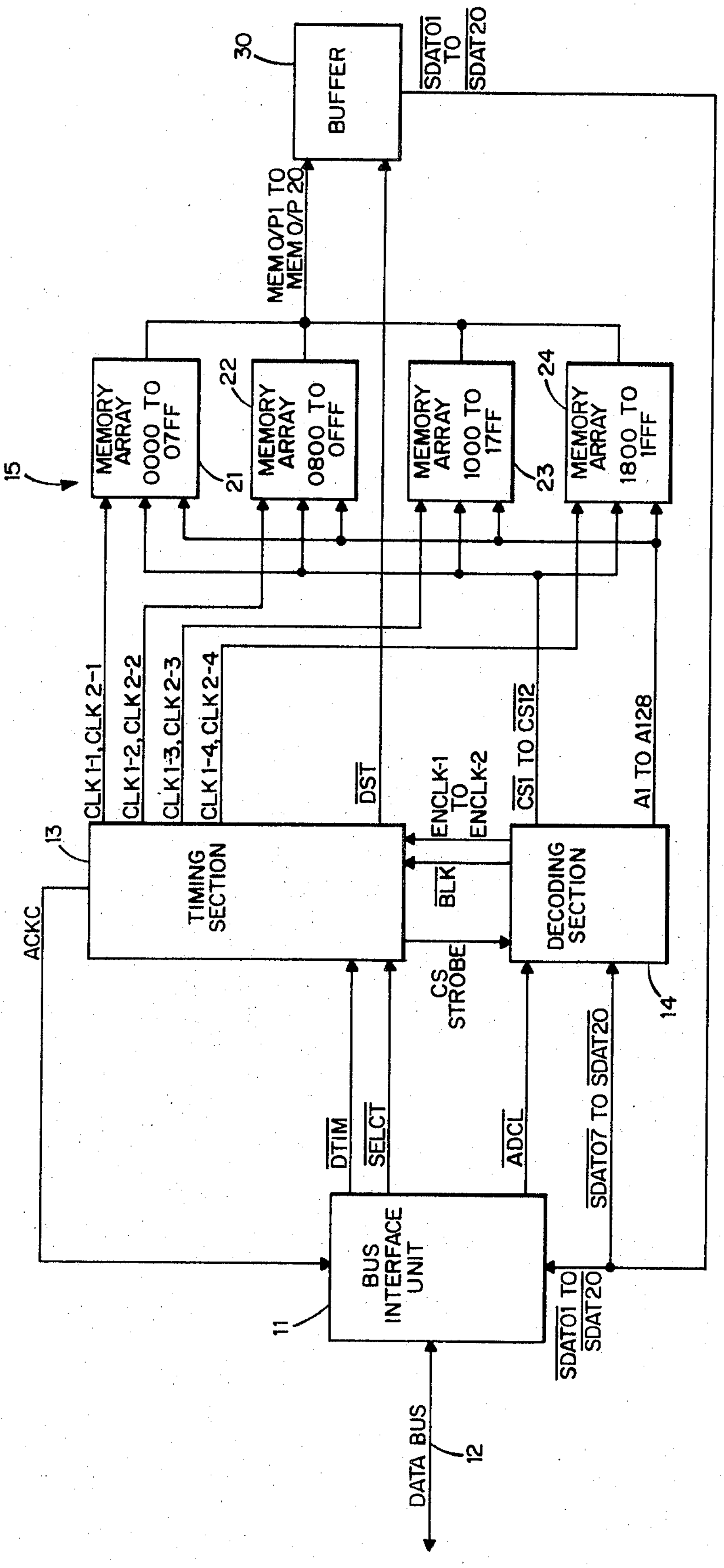
FIG. 1 is a block diagram of a read only memory system in accordance with the present invention employed in the communication switching system described in the referenced applications.

A memory system in accordance with the present invention which is utilized as the program memory for storing the instruction program for the central processor of the communication system described in the referenced applications is illustrated in FIG. 1. The memory system operates through a bus interface unit 11 which is described in detail in the referenced applications and controls the transfer of data between the memory system and a data bus 12. The data bus includes 20 lines over which address information is received from the central processor for addressing the memory and over which a 20-bit program word which is read out of the memory is transmitted to the central processor. The bus interface unit 11 receives control information over other lines of the data bus 12, and uses this information together with signals from the memory to control the transfer of data from the data bus to the memory and from the memory to the data bus. The manner of operation of the bus interface unit as well as the general functions of the memory system with respect to the entire communication system is described and explained in detail in the referenced applications.

Figure 2:
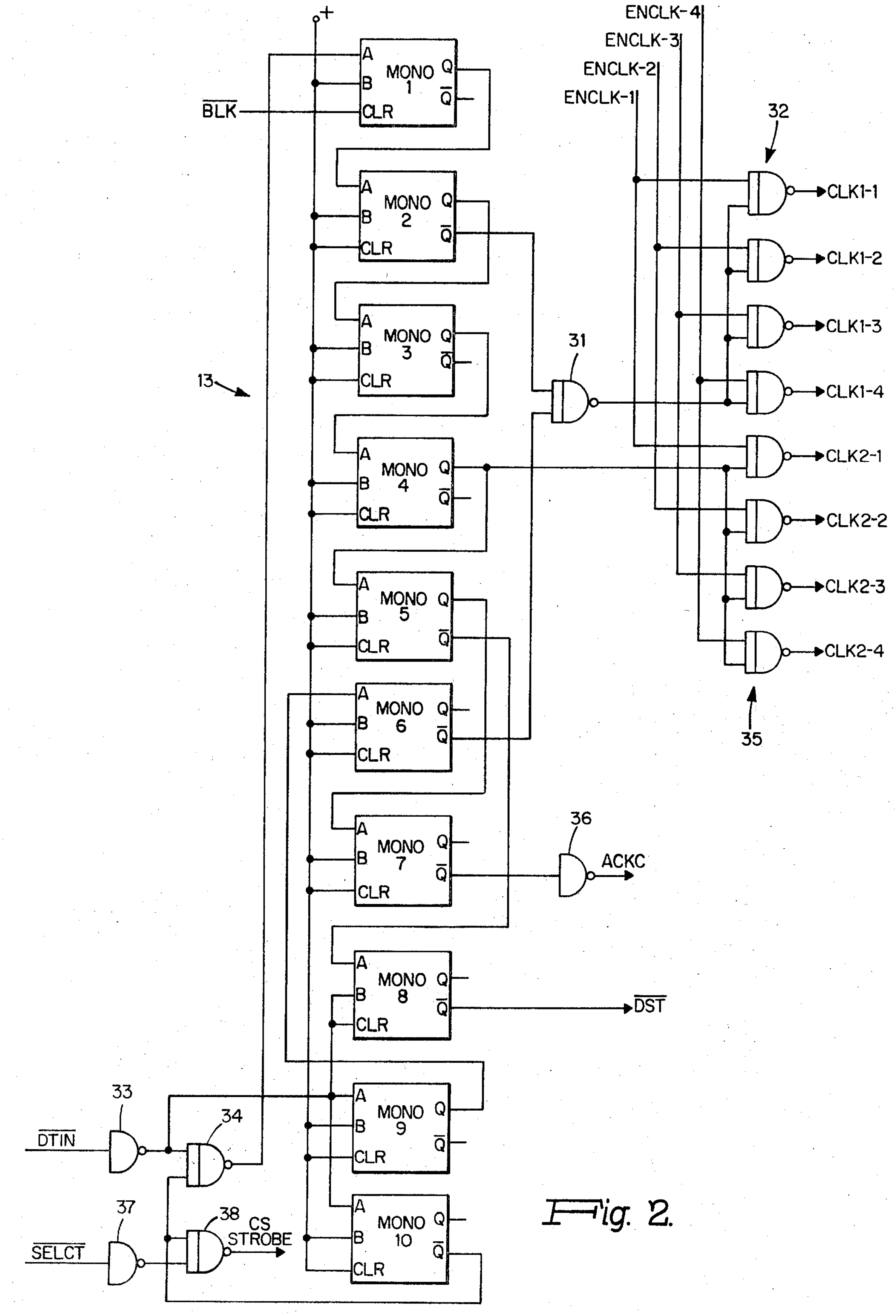
FIG. 2 is a detailed block diagram of the timing section of the system of FIG. 1.

The memory system employs a timing section 13 which is illustrated in greater detail in the block diagram of FIG. 2. $\overline{\text{DTIN}}$ and $\overline{\text{SELCT}}$ signals received from the bus interface unit 11 are employed to actuate a train of monostable multivibrators and associated logic to produce a sequence of timing signals shown in the timing diagram of FIG. 6.

Figure 3:
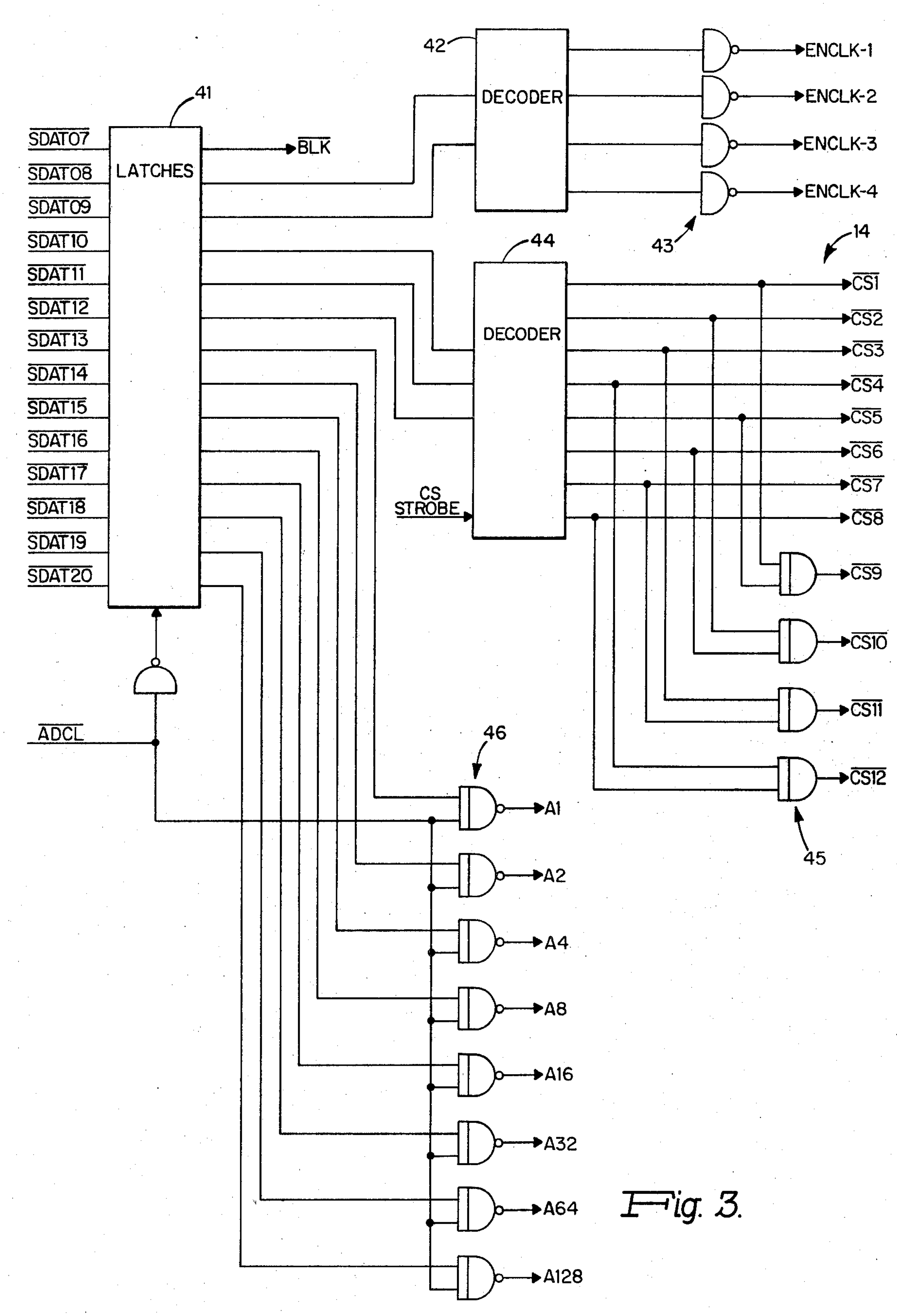
FIG. 3 is a detailed block diagram of the decoding section of the system.

The address information from the bus interface unit 11 is applied to a decoding section 14, shown in greater detail in FIG. 3, over lines for signals $\overline{\text{SDAT07}}$ to $\overline{\text{SDAT20}}$. The decoding section 14 decodes the address information to provide address information in appropriate form to the memory section 15. The decoding section 14 and timing section 13 are interconnected so that certain of the address information from the decoding section is applied to the memory section at the proper time during an operating cycle, and also so that clock pulses to the memory section 15 from the timing section 13 are directed to the memory section 15.

The memory section 15 includes an arrangement of four identical memory arrays 21, 22, 23, and 24. One of the memory arrays 21 is shown in greater detail in FIG. 4. As will be explained in detail hereinbelow, each array includes 20 individual memory elements each capable of storing 256 8-bit word segments. The memory elements are read only memories of the MOS type and are pre-programmed so that each array contains 2,048 20-bit program words. In accordance with the present invention as will be explained in detail hereinbelow, one 8-bit portion of a 20-bit program word is stored in a word segment in one memory element, and another 8-bit portion of the program word is stored in a word segment in another memory element, and the remaining 4-bit portion is stored in 4 bits of a word segment in a third memory element. The other 4 bits of the word segment in the third memory element are a 4-bit portion of another program word. The 20 memory elements of each array thus contain 2,048 program words, and the entire memory section of four arrays contains a library of 8,192 program words. As indicated by the designation in hexadecimal notation in FIG. 1, memory array 21 contains program words 0000 through 07FF (1 through 2,048 in decimal notation), memory array 22 contains program words 0800 through OFFF (2,049 through 4,096 in decimal notation), memory array 23 contains program words 1000 through 17FF (4,097 through 6,144 in decimal notation) and memory array 24 contains program words 1800 through 1FFF (6,145 through 8,192 in decimal notation).

The 20 bits of a program word are read out from the appropriate memory elements in the memory section and applied in parallel over lines for signals MEMO/P1 to MEMO/P20 to a buffer arrangement 30. At the appropriate time during an operating cycle a $\overline{\text{DST}}$ signal from the timing section 13 gates the 20 bits of the program word to the bus interface unit 11 over lines for signals $\overline{\text{SDAT01}}$ to $\overline{\text{SDAT20}}$. The bus interface unit 11 transfers the program word to the central processing unit of the communication system over the data bus 12.

Timing Section

The timing section 13 of the system is illustrated in detail in the logic diagram of FIG. 2. Throughout the discussion herein positive logic is assumed in which a relatively positive potential represents a digital 1 and a relatively negative potential represents a digital 0. The drawing symbols for various logic elements are similar to those employed in the referenced applications.

The timing section 13 employs a train of retriggerable monostable multivibrators labeled MONO 1 through MONO10. Each monostable multivibrator includes a resistance-capacitance-diode network which determines its time constant. A monostable multivibrator is triggered by a negative-going transition at input A if input B is 1 or by a positive-going transition at input B if input A is 0. When a circuit is triggered on, the Q output changes from 0 to 1 and the $\overline{Q}$ output changes from 1 to 0. The outputs revert to their original states after a period of time determined by the time constant in the circuit. A 1 at input A or a 0 at input B holds the circuit in its original or reset condition.

Figure 6:
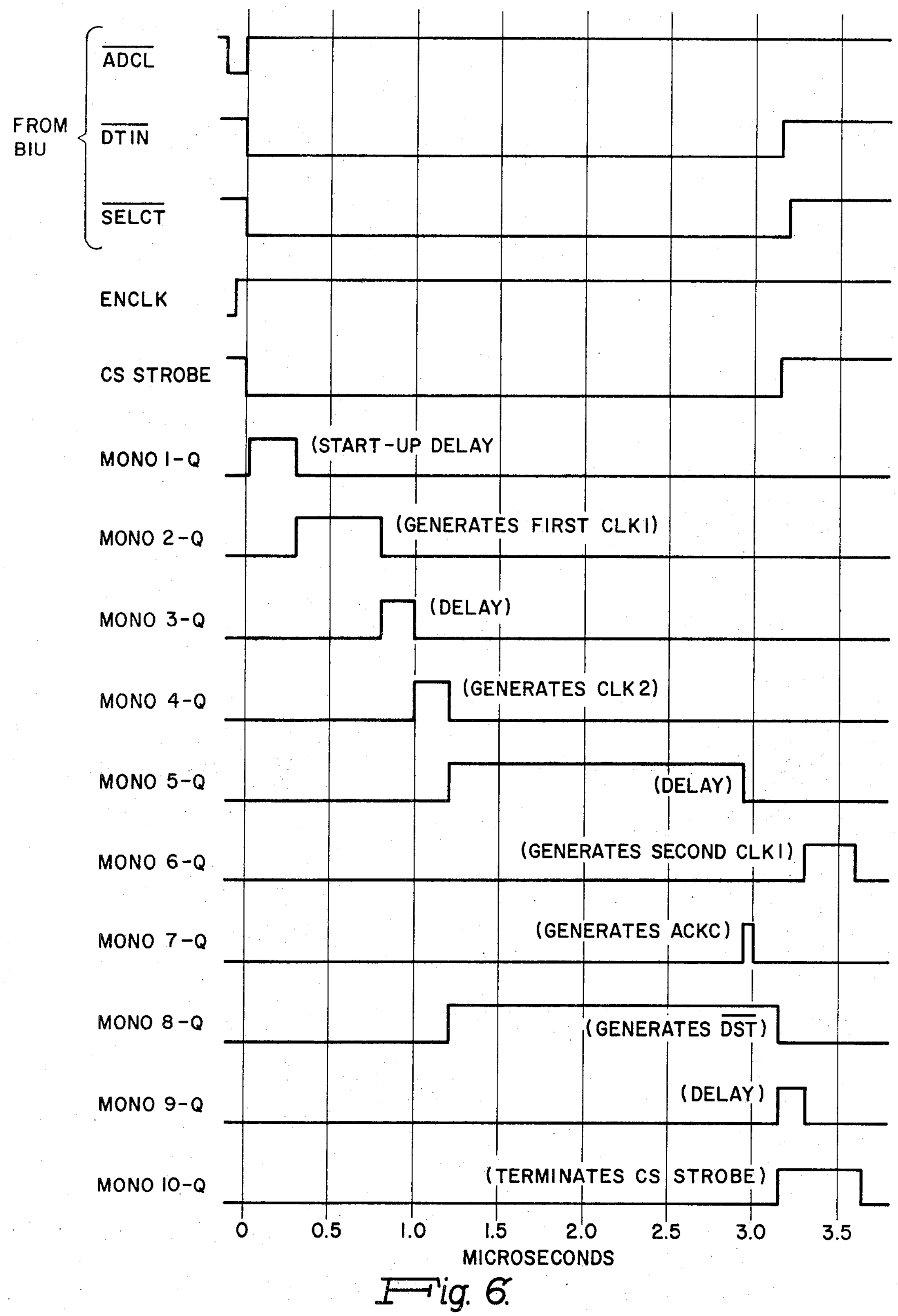
FIG. 6 is a timing diagram useful in explaining the operation of the system.

The first multivibrator MONO1 of the train is triggered by a negative-going $\overline{\text{DTIN}}$ signal from the bus interface unit 11 as illustrated in the timing diagram of FIG. 6. The $\overline{\text{DTIN}}$ signal is applied to an inverter 33 and gated through a NAND gate 34 by virtue of the off condition of the MONO10 multivibrator. The resulting sequence of output conditions at the Q output of each monostable multivibrator is shown in FIG. 6. Either the Q or $\overline{Q}$ outputs of the multivibrators are employed to generate delays or signals which are employed to initiate or terminate actions throughout the system. A $\overline{\text{SELCT}}$ signal from the bus interface unit 11 starts at the same time as the $\overline{\text{DTIN}}$ signal. This signal passes through an inverter 37 and is gated through a NAND gate 38 by the off condition of the MONO10 multivibrator to produce a CS STROBE signal to the decoding section 14.

As illustrated in the timing diagram of FIG. 6, the $\overline{\text{DTIN}}$ signal triggers the first monostable multivibrator MONO1 which produces a start-up delay pulse to insure that the components in the decoder section 14 have received the address information from the bus interface unit 11 and that their operation has stabilized. At the end of the delay pulse the MONO1 multivibrator triggers the MONO2 multivibrator which produces a pulse. The pulse through a NAND gate 31 to an arrangement of clock NAND gates 32. Depending on which of ENCLK-1 to ENCLK-4 signals are applied to the NAND gates 32 from the decoder section 14, a CLK1-1 to CLK1-4 pulse is generated and transmitted to one of the four memory arrays 21, 22, 23, and 24. The CLK1 pulse is employed by the memory elements as will be explained hereinbelow.

The trailing edge of the pulse from the MONO2 multivibrator triggers the MONO3 multivibrator which produces another delay pulse. The termination of the delay pulse causes the MONO4 multivibrator to produce a pulse which is applied to an arrangement of clock NAND gates 35. The pulse is gated to one of lines CLK2-1 to CLK2-4 depending upon which of the ENCLK-1 to ENCLK-2 lines has a signal thereon. Thus a CLK2 pulse is transmitted to the same memory array as the previous CLK1 pulse. Its function will be explained hereinbelow.

The trailing edge of the pulse from the MONO4 multivibrator triggers the MONO5 multivibrator. When the MONO5 multivibrator is turned on, it triggers the MONO8 multivibrator. The MONO 8 multivibrator produces the $\overline{DST}$ signal which is applied to the buffer 30 in order to gate data from the memory section 15 to the lines carrying signals $\overline{SDAT01}$ to $\overline{SDAT20}$. When the on period of the MONO5 multivibrator is complete, the transition of the MONO5 multivibrator causes the MONO7 multivibrator to generate a very short pulse which passes through an inverter 36 to produce an ACKC signal. This signal is employed by the bus interface unit 11 as an indication that the program word has been read out of the memory and transmitted to the bus interface unit.

After receiving the ACKC signal generated by the MONO7 multivibrator, the bus interface unit 11 terminates the $\overline{DTIN}$ signal and, after a short delay, the $\overline{SELCT}$ signal. The termination of the $\overline{DTIN}$ signal triggers the MONO8 multivibrator off and the MONO9 and MONO10 multivibrators on. When the MONO8 multivibrator is triggered off, the $\overline{DST}$ signal to the buffer 30 is terminated. The MONO9 multivibrator initiates a delay pulse, and the MONO 10 multivibrator produces a signal which is applied to the NAND gate 38 and terminates the CS STROBE signal to the decoding section 14.

The trailing edge of the delay pulse from the MONO9 multivibrator triggers the MONO6 multivibrator. A pulse from the MONO6 multivibrator passes through the NAND gate 31 to the array of NAND gates 32. The pulse is gated through one of the gates by one of the signals ENCLK-1 to ENCLK-4 thereby providing a second CLK1 pulse on the same line to the same memory array.

Decoding Section

Figures 7, 8:
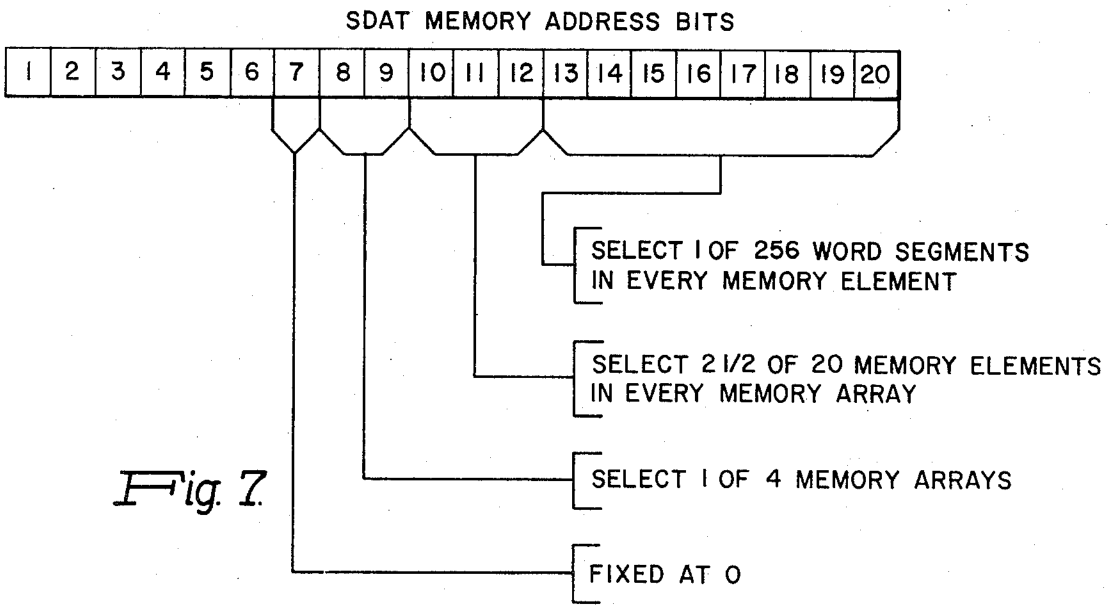
FIG. 7 is a chart illustrating the organization of the bits of the memory address information.
FIG. 8 is a table of input and output signals for a portion of the decoding section.

The decoding section 14 is illustrated in detail in the logic diagram of FIG. 3. Signals $\overline{SDAT07}$ to $\overline{SDAT20}$ are transmitted in parallel from the bus interface unit 11 to the decoding section. These signals are the memory address information bits for addressing the desired program word stored in the memory section 15. The first 6 bits $\overline{SDAT01}$ to $\overline{SDAT06}$ are not utilized within the memory system shown but control other selection steps not under discussion. FIG. 7 is a chart illustrating the memory address bits and the functions they perform in selecting the desired program word.

The address input data bits $\overline{SDAT07}$ to $\overline{SDAT20}$ from the bus interface unit 11 are applied to an arrangement of latches 41. The latches are of the type which respond to input data during a positive signal at a control connection, and on a negativegoing transition at the control connection latch to hold the input data until a subsequent positive-going signal. An $\overline{ADCL}$ pulse (see FIG. 6) from the bus interface unit 11 loads the address bits in the latches on its trailing edge.

As indicated by the chart of FIG. 7 the address input data stored in the latches 41 designates various portions of the memory address. In this particular instance the SDAT07 bit must be a 0 or the entire memory system is held inactivated. A O SDAT07 bit produces a positive $\overline{BLK}$ signal which enables the MONO1 multibibrator in the timing section 13.

The address bits $\overline{SDAT08}$ and $\overline{SDAT09}$ are applied to a first decoder 42. This decoder decodes the two input bits and produces an inverted output on one of four output lines. The decoder output lines are each connected through different ones of an arrangement of inverters 43 so as to provide a signal ENCLK-1 to ENCLK-4 on the appropriate one of their output lines. As indicated by the timing diagram of FIG. 6, one of these signals is present from the time the input data is loaded into the latches 41 (except for propagation delays) until the end of the operating cycle. The signal is applied to the NAND gate arrangements 32 and 35 of the timing section 13 and determines which one of the four memory arrays receive the CLK1 and CLK2 pulses generated in the timing section.

As indicated by the chart of FIG. 7 address bits SDAT10 to SDAT12 designate particular memory elements within a memory array. The bits SDAT10 to SDAT12 stored in the latches 41 are conducted from the outputs of the latches 41 to a second decoder 44. Decoder 44 provides an inverted output signal $\overline{CS1}$ to $\overline{CS8}$ on one of eight output lines only during the presence of a CS STROBE signal at a control input. The CS STROBE signal is received from the timing section 13 as shown in the timing chart of FIG. 6.

The eight output connections carrying signals $\overline{CS1}$ to $\overline{CS8}$ from the decoder 44 are also connected to an arrangement of four decoder two-input AND gates 45 having output connections for carrying signals $\overline{CS9}$ to $\overline{CS12}$. The truth table for signals CS1 through CS12 in response to signals SDAT10 to SDAT12 is shown in FIG. 8. The manner in which the $\overline{CS1}$ to $\overline{CS12}$ signals are employed to select the memory elements of a memory array will be explained in detail hereinbelow.

The last eight bits $\overline{SDAT13}$ to $\overline{SDAT20}$ of the address information designates one of 256 word segments of a memory element. These bits are conducted individually to NAND gates 46. Each of the NAND gates has a second input connected to the line carrying the ADCL signal so that the output data A1 through A128 does not appear on the NAND gate output lines until after the ADCL pulse which loads the $\overline{SDAT07}$ to $\overline{SDAT20}$ bits into the latches 41. Each memory element receives all eight bits A1 to A128 and each memory element contains a decoder for decoding to address an individual word segment.

Memory Section

AS shown in FIG. 1 the memory section 15 includes four arrays of memory elements 21, 22, 23, and 24. One of the memory arrays 21 which contains program words 0000 to 07FF (1 through 2,048 in decimal notation) is shown in detail in FIG. 4. In a specific embodiment of the system the four memory arrays are identical and each is fabricated on an individual circuit board. Each memory element as shown in FIG. 4 is a single component capable of storing 2,048 bits in an arrangement of 256 8-bit word segments. The memory elements are pre-programmed MOS type devices and operate in the present system as read only memories. One such type of memory element is a type 1601 programmable memory sold by Intel Corp. In order for data to be read out of a memory element a 0 must be applied at its select input. One of the lines carrying signals $\overline{CS1}$ to $\overline{CS12}$ is connected to the select input connection of each element. Lines carrying signals A1 to A128 are connected in parallel to eight address input connections of each memory element. Each memory element includes a decoder for selecting one of the 256 word segments from the data received. Each memory element has two clock input connections, one connected to the line carrying the CLK1-1 signal and the other connected to the line carrying CLK2-1 signal, for receiving CLK1 and CLK2 pulses from the timing section 13. The eight bits of the word segment selected are read out in parallel on eight output lines through output gates within the memory element.

A memory element operates in the following manner in response to clock input pulses of the nature illustrated in FIG. 6. In order to maintain power drain at a minimum, the memory element normally remains in an inactive condition. On receipt of a first CLK1 pulse the memory elements of the array are activated by applying power to the decoder for the address bits A1 to A128. The CLK2-1 pulse then turns on the output gates of any activated memory element having a 0 at its select input connection; that is a $\overline{CS}$ signal. Thus, after the CLK2-1 pulse the 8 bits of the selected word segment are presented in parallel at the eight output lines of the memory element. The memory element is inactivated to its original state by the second CLK1-1 pulse occurring after the $\overline{CS}$ signal on the select line has changed to 1.

In accordance with the present system a total of 20 such memory elements are employed in each array. Each memory element of the array 21 contains portions of particular program words as labeled in FIG. 4 employing hexadecimal notation for designating words. For example, the first 8 bits of program words in the set 0000 through 00FF are stored in memory element 60, the second eight bits of these words are stored in memory element 61, and the last 4 bits are stored in memory element 51. Also, the first 8 bits of program words of the set 0400 through 04FF are stored in memory element 62, the second 8 bits in memory element 63, and the last 4 bits in memory element 51. Since the memory elements are organized in 8-bit word segments, each word segment in memory element 51 contains a 4-bit portion of a program word in the set from 0000 to 00FF and also a 4-bit portion of a program word in the set from 0400 to 04FF.

The address lines for signals A1 to A128 from the decoding section 14 which address a particular word segment in each memory element are connected in parallel to the eight address inputs of each of the 20 memory elements of the array. The associated CLK1-1 and CLK2-1 signal lines from the timing section 13 are also connected to each of the 20 memory elements of the array. The $\overline{CS1}$ to $\overline{CS8}$ signal lines are each connected to the select inputs of two memory elements containing bits 1 to 8 and 9 to 16 of the same set of program words. For example, the $\overline{CS1}$ signal line is connected to memory elements 60 and 61 and the $\overline{CS5}$ signal line is connected to memory elements 62 and 63. Lines for signals $\overline{CS9}$ to $\overline{CS12}$ are each connected to the appropriate one of the four memory elements containing bits 17 to 20 of two sets of program words. For example, a $\overline{CS9}$ signal is produced when either a $\overline{CS1}$ or $\overline{CS5}$ signal is produced as shown by the connections to the decoder NAND gates 45 in FIG. 3 and the truth table of FIG. 8. Therefore, the $\overline{CS9}$ signal line is connected to the select input of memory element 51 which contains portions of program words of the same sets as contained in memory elements 60 and 61 and memory elements 62 and 63.

The eight outputs of the eight memory elements containing bits 1 to 8 of the program words are connected in parallel to lines for signals MEMO/P1 to MEMO/P8 by way of the bufferdriver 85. The eight outputs of the eight memory elements containing bits 9 to 16 of the program words are connected in parallel to lines for signals MEMO/P9 to MEMO/P16 by way of bufferdriver 86. The first four outputs of the four memory elements containing bits 17 to 20 of the program words are connected in parallel to the first inputs of a set of four memory output NAND gates 52, and the last four outputs of the four memory elements are connected in parallel to the first inputs of another set of four memory output NAND gates 54. The outputs of the NAND gates of the first set 52 and the outputs of the corresponding NAND gates of the second set 54 are connected together and through an arrangement of inverters 56 to lines for signals MEMO/P17 to MEMO/P20.

The first set of memory output NAND gates 52 is controlled by a control NAND gate 53 having its output connected to the second inputs of NAND gates 52, and the second set of memory output NAND gates 54 is controlled by a control NAND gate 55 having its output connected to the second inputs of NAND gates 54. Lines for carrying signals $\overline{CS1}$ to $\overline{CS4}$ are connected to the four inputs of the NAND gate 53, and lines for carrying signals $\overline{CS5}$ to $\overline{CS8}$ are connected to the four inputs of NAND gate 55. Thus, if a $\overline{CS1}$ signal occurs with a $\overline{CS9}$ signal, control NAND gate 53 causes NAND gates 52 to be gated on and the bits on the first four output lines from memory element 51 are passed as bits MEMO/P17 to MEMO/P20. Since there are no $\overline{CS5}$ to $\overline{CS8}$ signals to control NAND gate 55, NAND gates 54 remain off and the bits on the last four output lines from memory element 51 are blocked and do not pass through NAND gates 54.

For example, in summary, if a 20-bit program word to be read out of the memory is designated by a $\overline{CS1}$ select signal, there will also be a $\overline{CS9}$ signal. Bits 1 to 8 of the program word are read out of memory element 60 and applied to the MEMO/P1 to MEMO/P8 signal lines, and bits 9 to 16 are read out of memory element 61 and applied to the MEMO/P9 to MEMO/P16 signal lines. The corresponding 8-bit word segment, as designated by the A1 to A128 signals is read out of memory element 51. The first four bits are bits 17 to 20 of the desired program word and the last four bits are not desired. The presence of the $\overline{\text{CS1}}$ signal on the input to the control NAND gate 53 causes memory output NAND gates 52 to gate bits 17 to 20 of the desired program word to the MEMO/P17 to MEMO/P20 signal lines, while the last four undesired bits are blocked by NAND gates 54.

Buffer

Figure 5:
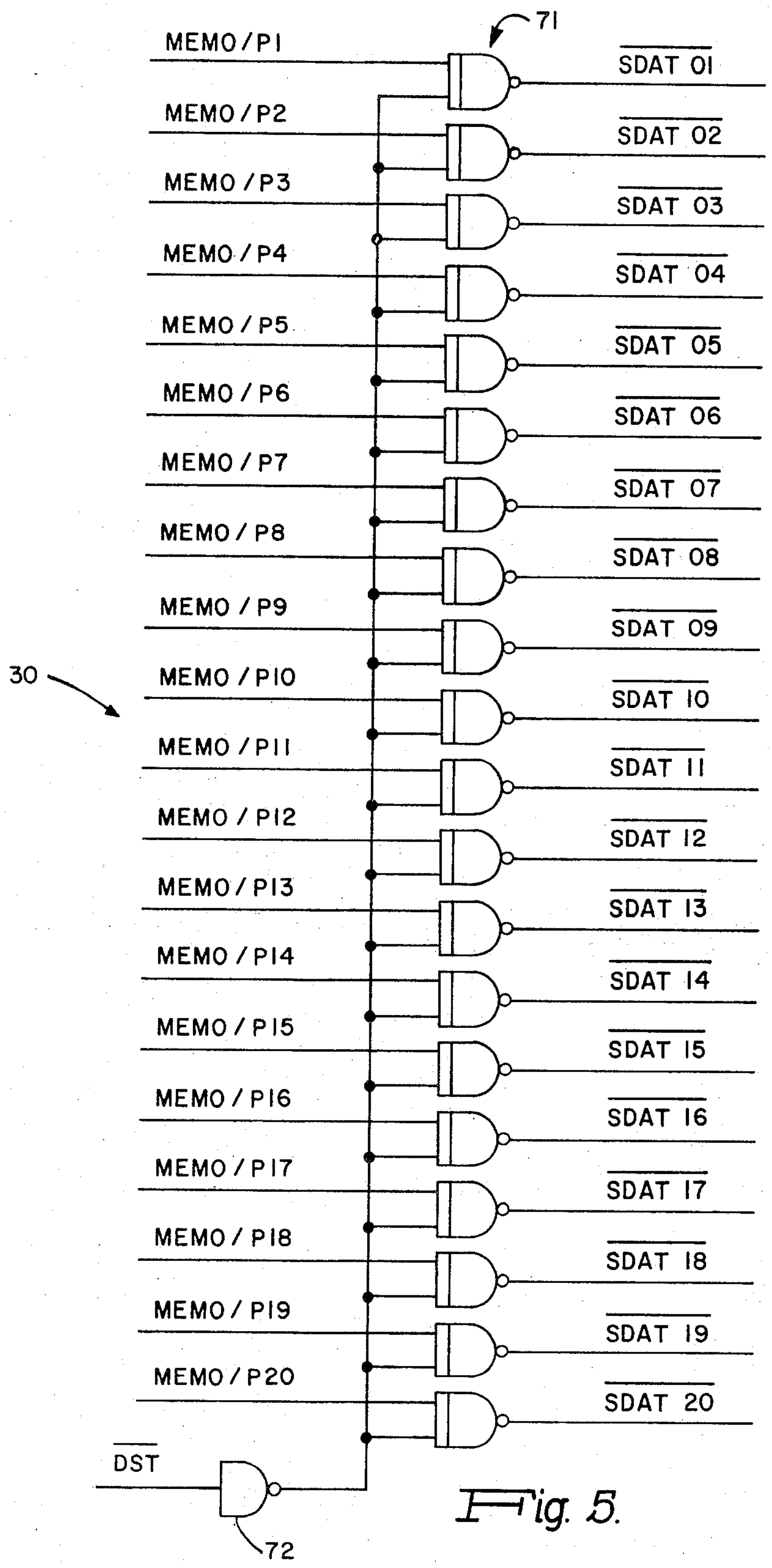
FIG. 5 is a detailed diagram of an output buffer arrangement employed in the system.

Each of the lines for MEMO/P1 to MEMO/P20 signals from the four memory arrays 21, 22, 23, 24 of the memory section 15 are connected together and to one of the inputs of an arrangement of 20 NAND gates 71 in the buffer 30 as shown in FIG. 5. The other input to each of the NAND gates 71 is the $\overline{\text{DST}}$ signal from the timing section 13 which is applied through an inverter 72. The outputs of the 20 NAND gates are connected to the $\overline{\text{SDAT01}}$ to $\overline{\text{SDAT20}}$ signal lines. As explained previously these lines are connected to the bus interface unit 11. Thus, when the $\overline{\text{DST}}$ signal occurs as shown in the timing diagram of FIG. 6, the 20 bits of the selected program word are passed through the NAND gates 71 to the bus interface unit over the lines for $\overline{\text{SDAT01}}$ to $\overline{\text{SDAT20}}$ signals for transfer by the bus interface unit 11 to the central processing unit over the data bus 12.

Operation

The memory system as described operates in the following manner to read out a program word designated by the input address information. 14 bits of address information $\overline{\text{SDAT07}}$ to $\overline{\text{SDAT20}}$ are applied to the latches 41 in the decoding section 14 over lines from the bus interface unit 11. Upon termination of an $\overline{\text{ADCL}}$ signal, as shown in FIG. 6, produced by the bus interface unit, address bits $\overline{\text{SDAT07}}$ to $\overline{\text{SDAT20}}$ becomes stored in the latches 41. At the termination of the $\overline{\text{ADCL}}$ signal, the bus interface unit 11 produces the $\overline{\text{DTIN}}$ and $\overline{\text{SELCT}}$ signals as shown in the timing diagram of FIG. 6. Since the $\overline{\text{SDAT07}}$ signal is a 0 as explained previously, a $\overline{\text{BLK}}$ signal is applied to the MONO1 multivibrator of the timing section 13 thereby enabling the timing section. Thus, on the negative-going leading edge of the $\overline{\text{DTIN}}$ signal the timing sequence is started by triggering on of the MONO1 multivibrator. Also, the negative-going leading edge of the $\overline{\text{SELCT}}$ signal causes the CS STROBE signal to be produced.

As shown in the timing diagram of FIG. 6 when the address bits $\overline{\text{SDAT08}}$ and $\overline{\text{SDAT09}}$ are applied to the decoder 42 from the latches 41, one of signals ENCLK-1 to ENCLK-4 is produced at the group of inverters 43. There is some propagation delay between the leading edge of the $\overline{\text{ADCL}}$ signal and the start of the ENCLK signal. Assuming, for example for the present discussion, that the memory address bits SDAT08 and SDAT09 are both 0's an ENCLK-1 signal is produced and applied to two of the NAND gates of the arrangement 32 in the timing section 13.

On the trailing edge of the $\overline{\text{ADCL}}$ pulse the NAND gates 46 are activated. The stored $\overline{\text{SDAT13}}$ to $\overline{\text{SDAT20}}$ bits are inverted by the NAND gate 46 and bits A1 to A128 are conducted to every memory element in all four arrays of the memory section 15.

The $\overline{\text{SDAT10}}$ to $\overline{\text{SDAT12}}$ bits stored in the latches 41 are applied to the decoder 44. During the occurrence of the CS STROBE signal the decoder 44 produces one of signals $\overline{\text{CS1}}$ to $\overline{\text{CS8}}$ and one of signals $\overline{\text{CS9}}$ to $\overline{\text{CS12}}$. Assuming for example that the SDAT10, SDAT11, and SDAT12 bits are 1, 0, and 1, respectively, then as indicated by the table of FIG. 8 a $\overline{\text{CS3}}$ signal and a $\overline{\text{CS11}}$ signal are present. These signals occur during the period of the CS STROBE signal.

After the delay produced by the MONO1 multivibrator, the MONO2 multivibrator produces a pulse which passes through the NAND gate 31 and is applied to the four NAND gates 32. The ENCKL-1 signal from the decoding section 14 gates the pulse through the appropriate clock NAND gate of the group 32 to produce a CLK1-1 pulse. This pulse is connected only to the first memory array 21 of the memory section 15.

As explained previously the A1 to A128 signals and the $\overline{\text{CS3}}$ and $\overline{\text{CS11}}$ signals are already being applied to the four memory arrays of the system. In the first memory array 21 the $\overline{\text{CS3}}$ signal is applied to the select inputs of memory elements 80 and 81 and the $\overline{\text{CS11}}$ is applied to the select input of memory element 82. The A1 to A128 bits are applied to the word segment address inputs of all the memory elements. For purposes of explanation let it be assumed that the A1 to A128 bits address the 54 (in hexadecimal notation) word segment in each memory element. Thus, since the $\overline{\text{CS3}}$ signal is present the word segment in memory element 80 containing bits 1 to 8 of program word 0254 is addressed. The word segment in memory element 81 containing bits 9 to 16 of program word 0254 is also addressed. Since the $\overline{\text{CS11}}$ signal is also present, the word segment in memory element 82 containing bits 17 to 20 of program word 0254 and bits 17 to 20 of program word 0654 is addressed.

The CLK1-1 pulse generated by the MONO2 multivibrator causes all the memory elements of the first array 21 to be activated. Since only a single array is activated rather than the entire memory section the power drain and power supply requirements are greatly reduced. After the delay produced by the MONO3 multivibrator, the MONO4 multivibrator produces a pulse which is gated through the proper clock NAND gate 35 by the ENCLK-1 signal to produce a CLK2-1 pulse. This pulse causes the memory elements 80, 81, and 82 which have select signals $\overline{\text{CS3}}$ or $\overline{\text{CS11}}$ applied thereto to be read out. Therefore, bits 1 through 8 of the 0254 program word appear on the MEMO/P1 to MEMO/P8 signal lines and bits 9 to 16 of the 0254 program word appear on the MEMO/P9 to MEMO/P16 signal lines. Bits 17 to 20 of program word 0254 appear at the first four outputs of memory element 82 and bits 17 to 20 of program word 0654 appear at the last four outputs of memory element 82.

Bits 17 to 20 of program word 0254 are applied to the inputs of the set of memory output NAND gates 52. Since a $\overline{\text{CS3}}$ signal is present, the control NAND gate 53 produces a signal activating the NAND gates 52. The signals for bits 17 to 20 of the 0254 program word thus pass through the NAND gates 52 and inverters 56 to appear on MEMO/P17 to MEMO/P20 signal lines. Bits 17 to 20 of program word 0654 are applied to memory output NAND gates 54. Since the control NAND gate 55 receives no input signals, there is no signal from the NAND gate 55 and the NAND gates 54 remain inactivated. Thus, bits 17 to 20 of the 0654 program word are blocked by the NAND gates 54.

Termination of the pulse from the MONO4 multivibrator triggers the MONO5 multivibrator to produce a delay pulse. When the MONO5 multivibrator changes states on the leading edge of the delay pulse, the MONO8 multivibrator is triggered and generates the $\overline{\text{DST}}$ signal as shown in the timing diagram of FIG. 6. The $\overline{\text{DST}}$ signal passes through inverter 72 to the arrangement of NAND gates 71 of the buffer 30 causing the 20 bits MEMO/P1 to MEMO/P20 of the 0254 program word to appear as signals $\overline{\text{SDAT01}}$ to $\overline{\text{SDAT20}}$ on lines to the bus interface unit 11. The data remains on these lines during the period of the $\overline{\text{DST}}$ signal for acquiring by the bus interface unit 11 which transfers the data to the data bus 12.

Upon completion of the delay pulse produced by the MONO5 multivibrator the MONO7 multivibrator is triggered to generate an ACKC signal to the bus interface unit 11. This signal indicates to the bus interface unit that the data in the form of the 20-bit program word has been read out of the memory and is presently on the lines for signals $\overline{\text{SDAT01}}$ to $\overline{\text{SDAT20}}$ and should have been received by the bus interface unit. Prior to this time, of course, the bus interface unit 11 has ceased sending the address information in the form of bits $\overline{\text{SDAT07}}$ to $\overline{\text{SDAT20}}$ on the same lines.

After receiving the program word and the ACKC signal, the bus interface unit 11 terminates the $\overline{\text{DTIN}}$ signal. This action triggers multivibrators MONO8, MONO9, and MONO10. The MONO8 multivibtator is triggered to terminate the $\overline{\text{DST}}$ signal, and the MONO9 multivibrator produces a short delay pulse. The MONO10 multivibrator is triggered to produce a signal which causes the CS STROBE signal, and consequently the $\overline{\text{CS3}}$ and $\overline{\text{CS11}}$ signals, to terminate. Shortly after the $\overline{\text{DTIN}}$ signal terminates, the $\overline{\text{SELCT}}$ signal is also terminated by the bus interface unit 11.

The trailing edge of the delay pulse produced by the MONO9 multivibrator triggers the MONO6 multivibrator to produce a pulse. This pulse is conducted by way of the NAND gate 31 and the appropriate NAND gate of the arrangement 32 as determined by the ENCLK-1, still present, to produce a second CLK1-1 pulse. Since the $\overline{\text{CS3}}$ and $\overline{\text{CS11}}$ select signals are no longer present, the CLK1-1 signal terminates the output signals being produced by memory elements 80, 81, and 82 and completely inactivates all memory elements of the array. This action, together with the termination of the pulse produced by the MONO10 multivibrator completes an operating cycle of the memory system, and it is in condition to accept address information $\overline{\text{SDAT07}}$ to $\overline{\text{SDAT20}}$ designating the next program word, together with the appropriate control signals, from the bus interface unit 11.

While there has been shown and described what is considered a preferred embodiment of the present invention, it will be obvious to those skilled in the art that various changes and modifications may be made therein without departing from the invention as defined by the appended claims.

What is claimed is:

1. A memory system having stored therein a plurality of words, each word having a fixed number of bits, comprising:

an array of memory elements, each memory element having the capacity for storing a quantity of word segments, each memory element having address input connections for selectively addressing each word segment of said quantity as determined by signals thereto, a number of output connections equal to the number of bits of a word segment, and a memory element select connection for enabling the memory element in response to a signal applied thereto, each memory element being operable in response to a signal at the memory element select connection to permit the bits of the word segment addressed by the signals at the address input connections to be read out at the output connections in parallel;

each of said word segments having a different number of bits than the fixed number of bits of a word, and each of the word segments of certain of said memory elements containing portions of at least two different words;

address receiving means for receiving address information selectively identifying a particular word of said plurality, said address information having a first portion designating a particular one of the word segments of the quantity of word segments in each memory element, and a second portion designating the memory elements having stored therein bits of the particular word;

decoding means including a first means coupled to said address receiving means and to the address input connections of all the memory elements of the array for applying signals to the address input connections to address the particular word segment of each of the memory elements as designated by the first portion of the address information;

said decoding means including a second means coupled to said address receiving means and to the memory element select connections of the memory elements of the array for applying signals to the memory element select connections of only the memory elements containing bits of the particular word as designated by the second portion of the address information, whereby said certain of said memory elements containing portions of different words in the same word segments receive a signal at the memory element select connection if designated by the second portion of the address information as containing bits of the particular word; and output gating means coupled to the output connections of said certain of said memory elements and to said second means of said decoding means for permitting bits read out of one of said certain memory elements which are a portion of the particular word to pass therethrough and for preventing bits of the same word segment which are not a portion of the particular word from passing therethrough.

2. A memory system in accordance with claim 1 wherein said second means of said decoding means includes a decoder coupled to said address receiving means and operable to produce a signal at a selected one of a plurality of decoder output connections as determined by the second portion of the address information, the number of decoder output connections being equal to the number of said certain memory elements times the number of different word portions in each word segment of the certain memory elements;

a plurality of decoder gates equal to the number of said certain memory elements, each decoder gate having an output connection connected to the memory select connection of a different one of said certain memory elements, each decoder gate having a number of input connections equal to the number of different word portions in each word segment of the certain memory elements, said input connections of the plurality of decoder gates each being connected to a different one of the decoder output connections, said plurality of decoder gates being operable to produce a signal at the memory select connection of a certain memory element in response to a signal at any of the inputs thereto from the decoder;

said output gating means includes a number of sets of output gates, the number of sets being equal to the number of different word portions in each word segment of the certain memory elements, the output connections of each of the said certain memory elements being connected to the inputs of the sets of output gates, the output connections associated with bits for different word portions stored in the same word segment being connected to different sets of output gates;

a number of control gates equal to the number of sets of output gates, each control gate having its output coupled to a different set of output gates, each control gate having its inputs individually coupled to a number of decoder output connections equal to the number of said certain memory elements, each control gate being coupled to decoder output connections which are connected to different decoder gates, each control gate being operable in response to a signal at a decoder output connection coupled thereto to activate the associated set of output gates thereby permitting bits of only a single word portion of the word segment being read out of a certain memory element and applied thereto to pass through the set of output gates, and each control gate being operable in the absence of a signal at any of the decoder output connections coupled thereto to maintain the associated set of output gates inactivate thereby preventing bits of a word portion of the word segment being read out of a certain memory element and applied thereto from passing through the set of output gates.

3. A memory system having stored therein a plurality of words, each word having a fixed number of bits, comprising an array of memory elements, each memory element having the capacity for storing a quantity of word segments, each memory element having address input connections for selectively addressing each word segment of said quantity as determined by signals applied thereto, a number of output connections equal to the number of bits of a word segment, and a memory element select connection for enabling the memory element in response to a signal applied thereto, each memory element being operable in response to a signal at the memory element select connection to permit the bits of the word segment selected by the signals at the address input connections to be read out of the output connections in parallel;

the fixed number of bits of a word being greater than the number of bits of a word segment and being other than an integral multiple of the number of bits of a word segment, each word segment of first memory elements containing bits of only a single word and each word segment of second memory elements containing portions of at least two different words;

address receiving means for receiving address information selectively identifying a particular word of said plurality, said address information having a first portion designating a particular one of the word segments of the quantity of word segments in each memory element, and a second portion designating the memory elements having stored therein bits of the particular word;

decoding means including a first means coupled to said address receiving means and to the address input connections of all the memory elements in the array for applying signals to the address input connections to address the particular word segment of each of the memory elements as designated by the first portion of the address information;

said decoding means including a second means having a decoder coupled to said address receiving means and having a plurality of decoder output connections, the number of output connections being equal to the number of words of the plurality of words divided by the quantity of word segments of each memory element, the decoder output connections being connected to memory element select connections of said first memory elements, each decoder output connection being connected only to first memory elements containing bits of the same words; and decoder gating means coupled to said decoder output connections and to the memory select connections of said second memory elements, said decoder gating means coupling each of said second memory elements to the decoder output connections which are connected to first memory elements containing bits of the same words contained in the second memory elements whereby each of said second memory elements is coupled to at least two of said decoder output connections;

said second means of said decoding means applying a signal to the memory element select connections of only the first and second memory elements containing any of the bits of the particular word designated by the second portion of the address information; and an output gating arrangement including at least two output gating means, the number of output gating means being equal to the number of word portions in each word segment of said second memory elements;

each output gating means having a number of first input connections equal to the number of bits of each word portion in each word segment of said second memory elements, each first input connection being connected to a different output connection of each of said second memory elements, all of the first input connections of an output gating means being connected to output connections for bits of a single word portion in each word segment;

each output gating means having a number of second input connections equal to the number of decoder output connections divided by the number of output gating means, each second input connection being connected to a different one of said decoder output connections, the second input connections being connected to decoder output connections which are coupled to the first memory elements containing bits of the same words as the word portions associated with the output connections of the second memory elements connected to the first input connections of the gating means;

each output gating means being operable in response to a signal at a decoder output connection connected to one of its second input connections to permit only the bits of the associated word portion of a word segment being read out by the memory to pass through the gating means;

whereby a signal at a decoder output connection enables all memory elements coupled to the decoder output connection including the second memory element coupled to the decoder output connection through the decoder gating means, and the same signal permits only the output gating means associated with word portions of the same words contained in the first memory elements being enabled to pass through the output gating arrangement, so that a signal at a decoder output connection together with a signal from the first means of the decoding means addressing only a single word segment of each enabled memory element causes all the bits of only one word to be read out of the memory system.

4. A memory system in accordance with claim 3 wherein said decoder gating means of said second means of the decoding means includes a plurality of decoder gates equal to the number of said second memory elements, each decoder gate having an output connection connected to the memory select connection of a different one of said second memory elements, each decoder gate having a number of input connections equal to the number of different word portions in each word segment of the second memory elements, each of said input connections being connected to a different one of the decoder output connections, the input connections of each decoder gate being connected to the decoder output connections which are connected to first memory elements containing bits of the same words contained in the second memory element connected to the output connections of that decoder gate, each decoder gate being operable in response to a signal at any one of its input connections to produce a signal at its output connection.

5. A memory system in accordance with claim 4 wherein each of said output gating means includes a plurality of first gates equal to the number of bits of each word portion in said second memory elements, each first gate having a first input connected to one output connection of each of said second memory elements, all of the first input connections being connected to output connections for bits of a single word portion in each word segment, each first gate having a second input connection and an output connection, said first gates being activated to permit a signal at the first input connection to appear at the output connection only during a signal at the second input connection;

a second gate having an output connection connected to all the second input connections of said first gates and having a number of input connections equal to the number of decoder output connections divided by the number of output gating means in the output gating arrangement, each input connection of the second gates of the output gating arrangement being connected to a different one of said decoder output connections, each input connection of a second gate being connected to one of the decoder output connections connected to first memory elements containing bits of the same words as the word portions associated with the output connections of the second memory elements to which the first input connections of the first gates are connected, said second gate being operable to produce a signal at its output connection during a signal at any one of its input connections.

6. A memory system in accordance with claim 5 wherein each of the word segments of each of said memory elements includes portions of two different words, a first group of output connections of each second memory element being associated with the bits of one word portion in each word segment and a second group of output connections of each second memory element being associated with the bits of the other word portion in each word segment;

each of said decoder gates is a two-input gate having one input connection connected to the decoder output connection connected to a first memory element containing bits of a first set of words, a second input connection connected to the decoder output connection connected to a first memory element containing bits of a second set of words, and an output connection connected to a second memory element containing word portions for the first set of words and for the second set of words;

said output gating arrangement includes a first and second output gating means, the first input connections of the first gates of the first output gating means being connected to the second memory element output connections associated with the word portions of the first set of words, and the first input connections of the first gates of the second output gating means being connected to the second memory element output connections associated with the word portions of the second set of words;

the input connections of the second gate of the first output gating means being connected to the decoder output connections connected to the first memory elements containing bits of the first set of words, and the input connections of the second gate of the second output gating means being connected to the decoder output connections connected to the first memory elements containing bits of the second set of words.

* * * * *